United States Patent [19]

Hillman et al.

[11] Patent Number: 4,491,898

[45] Date of Patent: Jan. 1, 1985

[54] FUSE MOUNTING FOR PAD MOUNTED UNDERGROUND DISTRIBUTION SYSTEM

[75] Inventors: Carl M. Hillman, Little Genesee; James W. Dragon, Olean, both of N.Y.

[73] Assignee: McGraw-Edison Company, Rolling Meadows, Ill.

[21] Appl. No.: 482,197

[22] Filed: Apr. 5, 1983

[51] Int. Cl.³ .............................................. H02B 11/12
[52] U.S. Cl. .............................. 361/432; 200/50 AA; 361/349
[58] Field of Search ............ 200/50 R, 50 A, 50 AA, 200/50 B, 50 C; 361/331–363, 432; 339/111

[56] References Cited

U.S. PATENT DOCUMENTS 3,458,672  7/1969  Vogel ............................ 361/335 X
4,250,357  2/1981  Hanke ............................ 361/349 X Primary Examiner—A. D. Pellinen
Assistant Examiner—Morris Ginsburg
Attorney, Agent, or Firm—Charles W. MacKinnon; Jon Carl Gealow; John S. Paniaguas

[57] ABSTRACT

A fuse mounting arrangement for a pad mounted underground electrical power distribution systems includes at least one fuse panel which is slideably mounted by means of slide bearing assemblies in a housing enclosure. The fuse panel is removably mounted on the slide bearing mounting channel by means of cooperating tabs, slots and C-shaped loops or eyes. Should a fuse panel or its associated power fuse require replacement, safety interlock means including fixed locking pins and a cooperating U-shaped handle having hooked portions for engaging the locking pins are provided. It is imperative that the fuse panel and its fuse be electrically isolated prior to removal or withdrawal of the same from the housing enclosure. Therefore, the fuse elbow connector and its associated line conductor are disposed in front of the handle which is pivotably mounted upon the fuse panel between a locking position and a release position. Normal disposition of the elbow connector and its line conductor in front of the handle prevents the handle from being pivoted to its release position. However, if the elbow connector and the line conductor are removed from the fuse prior to removal or withdrawal of the fuse panel from the housing enclosure, the fuse will be electrically isolated and the handle can be pivoted to its release position so as to permit withdrawal of the fuse panel and its fuse from the housing enclosure.

15 Claims, 5 Drawing Figures

FUSE MOUNTING FOR PAD MOUNTED UNDERGROUND DISTRIBUTION SYSTEM

BACKGROUND OF THE INVENTION

The present invention relates generally to pad mounted underground electrical power distribution systems, and more particularly to a safety interlock or latching means operatively associated with the fuse panel upon which the encapsulated current limiting power fuse is mounted such that the fuse must be electrically isolated prior to removal of the fuse panel and the fuse from the power distribution system housing enclosure when service is to be performed upon the fuse panel and/or the fuse mounted thereon, such as, for example, during replacement of the fuse panel and the associated fuse, or replacement of the encapsulated current limiting power fuse per se.

In conjunction with conventional pad mounted underground electrical power distribution systems, for example, it is occasionally necessary to service a particular line, circuit, or phase thereof through means of replacement of the associated encapsulated current limiting power fuse, or the entire fuse panel, which may have become damaged during operation of the system. In order to enhance or maximize the operational safety conditions of the system for the lineman or service operator personnel, it is imperative that the damaged fuse and/or its fuse panel be electrically isolated prior to the lineman or service operator personnel performing the necessary repair or replacement work thereon.

Ordinarily, the various circuits, lines, or phases comprising the electrical power distribution system are arranged in pairs and the rear terminal ends of the encapsulated current limiting fuses are electrically interconnected by means of encapsulated vacuum switchgear apparatus. In operation, one of each of the paired circuits, lines, or phases is actually in operation thereby providing electrical power service to the designated customers or consumers while the other one of each of the paired circuits, lines, or phases is not in operation but is disposed in a stand-by or back-up mode and is readily capable of being placed into service. A single switchgear installation is thus provided for service in connection with each pair of circuits, lines, or phases, and the switchgear installation comprises a pair of switch mechanisms which may be opened or closed to provide or interrupt electrical power to or from the line fuses, respectively. In this manner, when one of the paired line fuses, for example, becomes damaged and needs to be replaced, the switchgear switch mechanisms are operated in such a manner as to open the switch associated with the damaged fuse and its circuit or line thereby terminating power to such fuse and its circuit or line, while the other switch mechanism is closed so as to now provide electrical power to the back-up or stand-by circuit, line, or phase thereby bringing such circuit, line or phase into operation. In this manner, the electrical power service is restored to the designated customer or consumer within a minimum amount of time.

It is therefore to be appreciated that in accordance with the foregoing, and in furtherance of the provision of safe conditions attendant the replacement of the damaged fuse and/or fuse panel, electrical power to the rear terminal of the damaged fuse has been interrupted or terminated, however, the front terminal of the damaged fuse is still connected within its associated line, circuit, or phase which does not provide the lineman or repair service operator personnel with a safe condition. A need therefore exists for a means or system which will insure the fact that the front or forward terminal of the damaged fuse will be electrically disconnected prior to access being permitted to the fuse panel and its associated fuse. In this manner, the fuse and its associated fuse panel will be entirely electrically isolated and rendered completely safe to be approached and handled by the lineman or repair service operator personnel. An example of a system similar to that just proposed is disclosed within U.S. Pat. No. 4,250,357 issued to Kenneth E. Hanke. In this system, the insulated line conductors and their associated elbow connectors must be removed from the front or forward terminals or bushings of the fuses before the fuse panels and their associated fuses can be pivoted forwardly and downwardly in order to permit access to the fuses or other components, or in order to permit removal or replacement of the entire fuse panel. This system, however, is seen to be quite complex in that a redundant, dual-latch system is provided for releasing or latching the fuse panel within its enclosure panel, and in addition, as previously noted, the latching system is utilized in conjunction with pivotable fuse panels.

Accordingly, it is an object of the present invention to provide a new and improved electrical power distribution system.

Another object of the present invention is to provide a new and improved pad mounted underground electrical power distribution system.

Still another object of the present invention is to provide a new and improved fuse mounting arrangement for pad mounted underground electrical power distribution systems.

Yet another object of the present invention is to provide a new and improved fuse mounting arrangement for pad mounted underground electrical power distribution systems which overcomes the various safety deficiencies of conventional electrical power distribution systems.

Yet another object of the present invention is to provide a new and improved fuse mounting arrangement for pad mounted underground electrical power distribution systems which provides the necessary safety environment for lineman or repair service operator personnel during a service operation being performed upon the fuse panel or the power fuse per se.

Yet still another object of the present invention is to provide a new and improved fuse mounting arrangement for pad mounted underground electrical power distribution systems which includes a safety interlock or latching means operatively associated with the fuse panel and the encapsulated current limiting power fuse mounted thereon which prevents the fuse panel and its associated fuse form being withdrawn from the power distribution system housing enclosure prior to disconnection of the insulated circuit line conductors and their associated elbow connectors from the front or forward fuse terminals or bushings.

A further object of the present invention is to provide a new and improved fuse mounting arrangement for pad mounted underground electrical power distribution systems which includes a safety interlock or latching means operatively associated with the fuse panel and the encapsulated current limiting power fuse mounted thereon which prevents the fuse panel and its associated fuse from being withdrawn from the power distribution system housing enclosure in order to gain access to the rear portion of the fuse panel and the fuse mounted thereon prior to electrical isolation of the fuse panel and the power fuse mounted thereon by requiring the insulated circuit line conductors and their associated elbow connectors to be initially disconnected from the front or forward terminals or bushings of the fuse.

A still further object of the present invention is to provide a new and improved fuse mounting arrangement for pad mounted underground electrical power distribution systems which includes a safety interlock or latching means operatively associated with the fuse panel and the encapsulated current limiting power fuse mounted thereon which is relatively simple in structure and relatively simple to operate by means of the lineman or repair service operator personnel during the performance of a service operation whereby access to the rear surface of the fuse panel and the power fuse mounted thereon may be easily and rapidly achieved under entirely safe operating conditions.

A yet further object of the present invention is to provide a new and improved fuse mounting arrangement for pad mounted underground electrical power distribution systems which includes a safety interlock or latching means operatively associated with the fuse panel and the encapsulated current limiting power fuse mounted thereon which is especially adapted for use in conjunction with fuse panels which are slideably mounted within the power distribution system housing enclosure.

SUMMARY OF THE INVENTION

The foregoing and other objectives of the present invention are achieved through the provision of a fuse mounting arrangement for pad mounted underground electrical power distribution systems wherein the power fuse for each line, circuit, or phase is secured to the rear surface of the fuse panel by means of suitable brackets and clamps. The power fuse is disposed vertically upon the rear surface of the fuse panel, and the lower, rearwardly projecting terminal of bushing of the fuse is provided with a loadbreak bushing well connector for mating engagement with a loadbreak bushing insert which forms part of the encapsulated vacuum switchgear.

The upper, forwardly projecting terminal or bushing of the power fuse projects forwardly through the upper end of the fuse panel and is adapted for electrical power connection with a conventional elbow connector which, in turn, is operatively connected to one of the insulated power line conductors. Prior to obtaining or gaining access to the rear surface of the fuse panel and the interior power components operatively associated therewith, including the power fuse itself, it is highly desirable, and in fact imperative, that the fuse panel and the power fuse be rendered safe for approachment, handling, and servicing by the lineman or repair service operator personnel. This can be achieved by requiring the elbow connector to be electrically disconnected from the upper fuse busing prior to slideable removal or withdrawal of the fuse panel and its associated fuse from the power distribution system housing enclosure.

In accordance with the present invention, the foregoing is achieved through the provision of a safety interlock or latching means system operatively defined between the fuse panel, the power distribution system housing enclosure panel, and the elbow connector and its associated power line conductor. In particular, the safety interlock systems includes a pair of fixed, oppositely disposed locking pins projecting inwardly from the sidewalls of the chamber or slot defined within the housing enclosure within which the fuse panel is slideably disposed. A U-shaped handle or bail is pivotably mounted upon the fuse panel and the uppermost portion of each end of the handle is provided with C-shaped hook portions for cooperative interaction with the fixed locking pins of the enclosure panel. The U-shaped handle is normally disposed within a vertical plane such that the C-shaped hook portions have their open sides facing forwardly whereby the hook portions are disposed behind or rearwardly of the fixed locking pins. In this manner, when the handle is disposed within this mode, the fuse panel and its associated fuse cannot be withdrawn from the enclosure housing so as to permit access to the rear surface of the fuse panel and/or the components mounted thereon, including the power fuse.

In order to permit withdrawal or removal of the fuse panel and its associated power fuse from the power distribution system housing enclosure, the handle must be pivoted upwardly through an angle of slightly more than 90° such that the free end of the handle is disposed slightly above the horizontal plane within which the pivot pins or trunnions of the handle are disposed. In this manner, the C-shaped hook portions will now be disposed beneath the plane of the fixed locking pins thereby permitting slideable withdrawal or removal of the fuse panel and its associated fuse out from the housing enclosure. The electrical hazard safety interlock features of the present invention, however, are in fact further manifested through appreciation of the structural interdisposition of the U-shaped handle relative to the elbow connector and its associated insulated line conductor. The connector and conductor are disposed immediately in front of the associated fuse panel, and therefore the handle cannot be pivoted upwardly unless the elbow connector and its associated line conductor have been previously disconnected from the upper forwardly projecting power fuse bushing. Since the encapsulated vacuum switchgear mechanism had been previously actuated such that the particular fuse line, circuit, or phase with which the lineman or repair service personnel is now concerned has already been disconnected, disconnection of the elbow connector and its associated line conductor now serves to completely electrically isolate the particular fuse panel and its associated fuse rendering it safe for approachment, handling, and service by the lineman or service personnel. The particular fuse panel and its associated fuse may thus in fact be withdrawn or removed from the power distribution housing enclosure for replacement, for example, of the power fuse or the entire fuse panel with the power fuse as a single subassembly. Reinstallation of the completed or repaired fuse panel entails an operational procedural process precisely the reverse of the removal process with the elbow connector and its associated line conductor being re-connected to the upper fuse bushing subsequent to the complete insertion of the fuse panel into the power distribution housing enclosure and relatching of the safety interlock or latching means.

Thus it may be appreciated that the fuse mounting system of the present invention which encompasses the safety interlock or latching system therewithin, provides the lineman or service repair operator personnel with truly safe electrical environmental working conditions in that prior to gaining access to the fuse panel and its associated power fuse for replacement or repair of the panel and/or power fuse, the elbow connector and its associated line conductor must of necessity be removed from the particular service line, circuit, or phase panel thereby electrically isolating such fuse panel and the power fuse thereof.

Various other objects, features, and attendant advantages of the present invention will be more fully appreciated as they become better understood from the following detailed description when considered in connection with the accompanying drawings, in which like reference characters designate like or corresponding parts throughout the different views.

DETAILED DESCRIPTION OF THE PREFERRED EMBODIMENT

Figure 1:
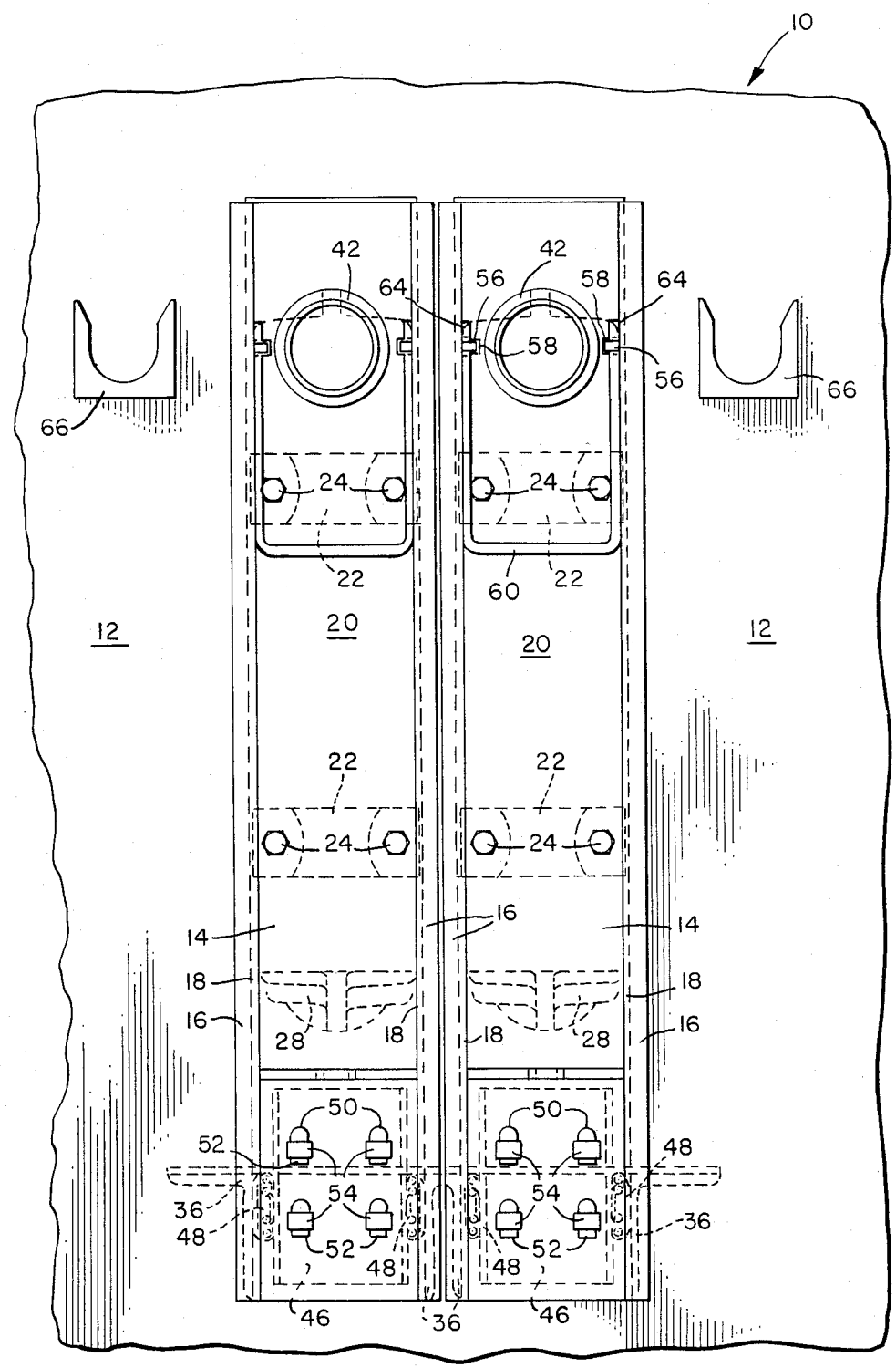
FIG. 1 is a partial front elevation view of a pad mounted underground elecrical power distribution housing enclosure showing a pair of fuse panel assemblies mounted therein with the new and improved safety interlock system of the present invention shown with its cooperative parts.
Figure 2:
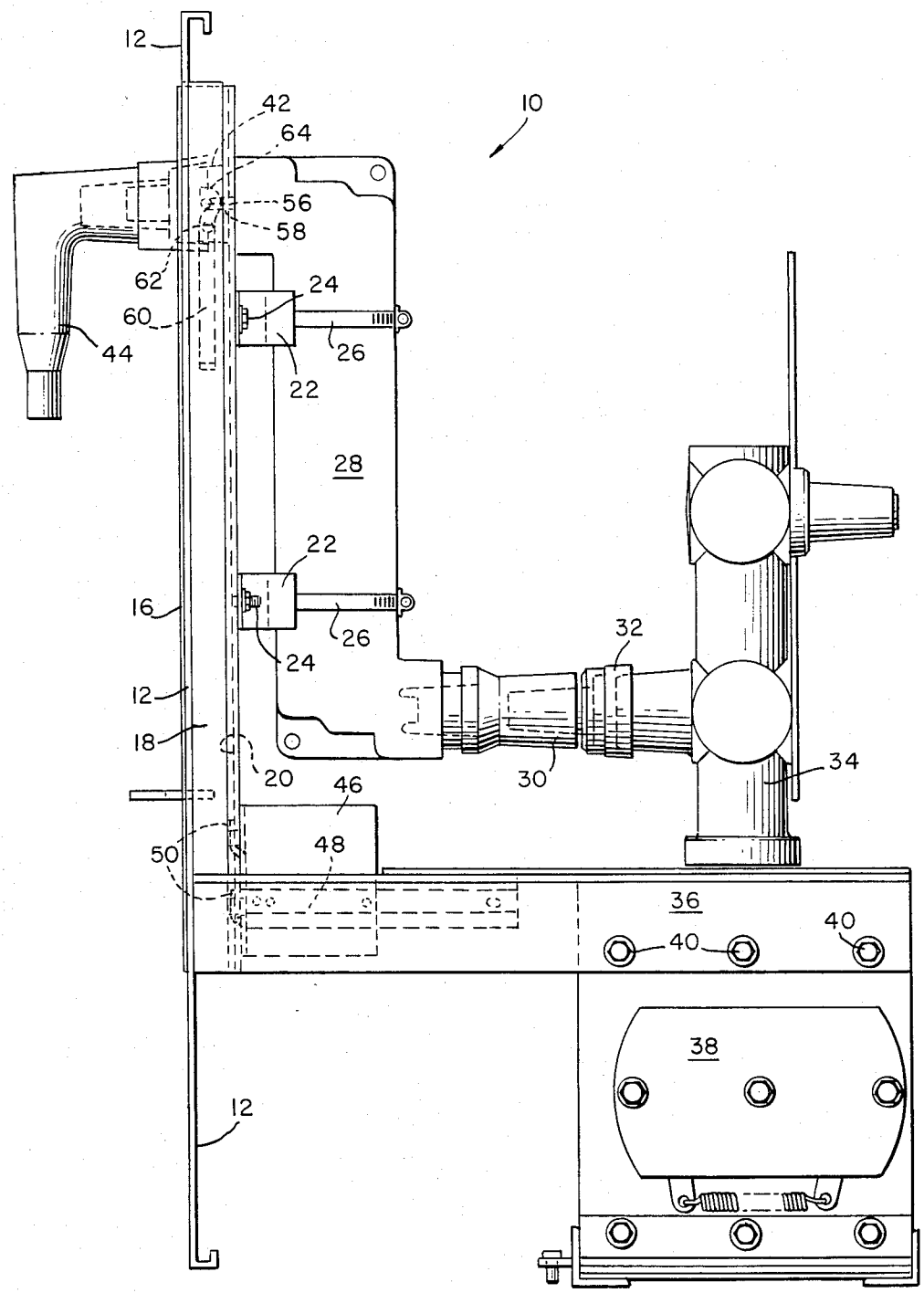
FIG. 2 is a side elevation view of one of the fuse panels of FIG. 1 as mounted within the power distribution housing enclosure with the power fuse thereof connected to the encapsulated vacuum switchgear and the elbow connector.

Referring now to the drawings, and more particularly to FIGS. 1 and 2 thereof, there is shown the new and improved pad mounted underground electrical power distribution system including the safety interlock or latching means of the present invention as generally indicated by the reference character 10. The power distribution system 10 includes a housing enclosure 12 which has defined therein a plurality of rectangular chambers within which the rectangular box-type fuse assemblies are slideably disposed. The fuse assemblies include vertically disposed fuse panels 14 which have a substantially U-shaped configuration as viewed in horizontal cross-section. In particular, each fuse panel 14 includes forwardly disposed laterally projecting flanges 16, rearwardly projecting sidewalls 18, and rearwardly recessed, transversely extending back walls 20. The fuse panels 14 form the forwardmost parts of the fuse assemblies and when mounted within the housing enclosure 12, the rear surfaces of the flanges 16 abut the front surface of housing enclosure 12. In this manner, the fuse panels 14 are recessed within the housing enclosure 12.

Suitable, vertically spaced, arcuately-shaped brackets 22 are secured to the rear face of each fuse panel back wall 20 by means of nut and bolt assemblies 24, and screw clamp mechanisms 26 which are operatively associated with brackets 22 in order to fixedly mount the encapsulated current limiting power fuse 28 upon the fuse panel back wall 20. The power fuse 28 is vertically disposed upon the fuse panel back wall 20 and the lower end of the fuse 28 is provided with a rearwardly projecting loadbreak bushing well connector 30 for disconnectable engagement with a mating loadbreak bushing insert 32 which projects forwardly from the encapsulated vacuum switchgear apparatus 34. The switchgear apparatus 34 includes switch mechanisms (not shown) which control electrical power to the paired fuse assemblies, as shown in FIG. 1, in such a manner that one of the fuse assemblies is operatively disposed in electrical power distribution service to designated customers or consumers while the other fuse assembly is disconnected from such service but readily available to be connected into service by being disposed within a stand-by or back-up mode. The switchgear apparatus 34 is mounted upon suitable angle-iron support structure 36 which, in turn, is secured to conventional torsion spring operating apparatus 38 by means of suitable nut and bolt fastening means 40.

The upper end of power fuse 28 is provided with a forwardly projecting loadbreak bushing insert 42 which projects through fuse panel back wall 20 so as to be accessible from an exterior position in front of the fuse panel 14 and housing enclosure 12. A conventional elbow connector 44, along with its associated insulated line conductor (not shown) are adapted for mating engagement with the loadbreak bushing insert 42. When elbow connector 44 is connected to the upper fuse loadbreak bushing insert 42, connector 44 and its associated line conductor (not shown) are disposed immediately in front of the associated fuse panel 14 within a vertically oriented, longitudinally extending plane centrally coincident with the longitudinal central plane of the fuse panel 14.

As noted hereinabove, the fuse assemblies comprising the fuse panels 14 and the power fuses 28 mounted thereon are adapted for slideable movement relative to the enclosure panel 12 between two extreme positions. In the normal recessed position or mode as illustrated within FIG. 2, for example, the fuse assemblies are housed internally within the housing enclosure having enclosure panel 12 as its front face, and when the fuse assemblies are disposed within this recessed position or mode, the fuse loadbreak bushing well connector 30 is in its mating position with respect to the switchgear loadbreak bushing insert 32. When the fuse assembly has been withdrawn forwardly from the housing enclosure, the aforenoted connection between the connector 30 and the insert 32 is broken. In order to facilitate the slideable movement of the fuse assemblies relative to the housing enclosure, the lower end of each fuse panel 14 is removably mounted upon a U-shaped mounting channel 46, and conventional track slide bearing assemblies 48, which slideably interconnect the sidewalls of mounting channel 46 and the angle iron support structures 36 which are disposed upon opposite sides of each fuse assembly changer defined within the housing enclosure, all as best seen in FIG. 1. Mounting channel 46 extends rearwardly of fuse panel 14, and is provided upon its front face with a plurality of upwardly extending L-shaped tabs or projections 50 which are arranged in a square array, as also best seen in FIG. 1. The back wall 20 of each fuse panel 14 is correspondingly provided with a plurality of cut-out slots 52 through which the L-shaped upstanding tabs or projections 50 may be inserted. A plurality of C-shaped loops or eyes 54 are also fixedly secured to the front face of each fuse panel 14 so as to overlie the front of each slot 52 defined within the fuse panel 14. In this manner, when the L-shaped projections or tabs 50 of the mounting channel 46 are inserted through the slots 52 of fuse panel 14 so as to engage the front face of the fuse panel and the panel is allowed to drop slightly, the tabs 50 will be effectively retained within the sockets defined by means of the fuse panel loops or eyes 54 as a result of the loops or eyes 54 seating upon the mounting channel tabs 50. Thus, the fuse panels 14 may be removably mounted upon the mounting channels 46 so as to facilitate replacement of the fuse panels 14 with their power fuses 28 as a single entity or subassembly.

When in fact a fuse panel 14 or a power fuse 28 mounted thereon is desired to be replaced, such as, for example, when a power fuse 28 has become damaged during operation, or when it is determined to replace the entire fuse assembly including the fuse panel 14 in order to simplify and expedite service repairs, the fuse assembly comprising the fuse panel 14 and its associated fuse 28 must be withdrawn from the housing enclosure to its withdrawn position from its recessed position, illustrated within FIG. 2. Prior to withdrawal of the particular fuse assembly to be repaired from the housing enclosure 12, it is desirable to electrically isolate fuse panel 14 and power fuse 28 so as to render the working environment for the lineman or repair service operator personnel safe from potential electrical hazards. This process is normally initiated by means of suitable actuation of the switch mechanisms (not shown) of the vacuum switchgear 34 so as to remove, for example, the damaged fuse line, circuit, or phase from service operation and to connect the back-up or stand-by circuit, phase, or line into operative service. Despite the fact that the switchgear apparatus 34 has been actuated in the foregoing manner, the safety characteristics of the working environment have not in fact been assured or maximized, and there still exists a potential electrical hazard, in view of the fact that, the elbow connector 44 and its associated line conductor (not shown) are still connected to the fuse loadbreak bushing insert 42. Consequently, in order to enhance the safety characteristics of the working environment for the lineman or repair service operator personnel, it is desirable to construct a safety interlock or latching system between the fuse assembly and the distribution system housing enclosure, as well as the elbow connector and its associated line conductor, such that the latter components must be removed or disconnected from the fuse bushing insert 42 prior to withdrawal of the fuse panel 14 and the power fuse 28 from the housing enclosure 12. In this manner, the lineman or service personnel is assured that upon approaching and handling the fuse assembly to be serviced, the same will have already been entirely electrically isolated and therefore is completely safe to have service repair work performed thereon.

Figure 3:
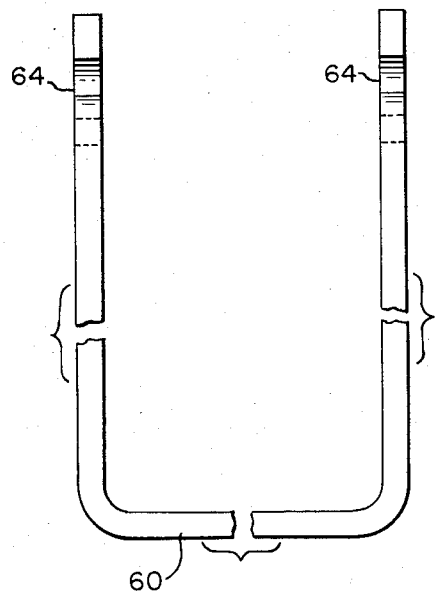
FIG. 3 is a front elevation view of the safety interlock handle which operatively cooperates with the housing enclosure locking pins.
Figure 4:
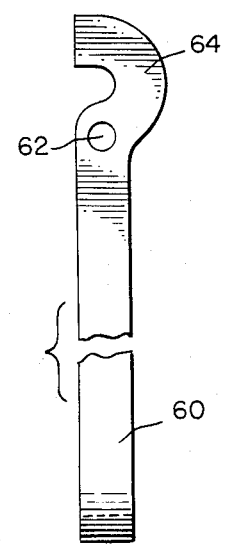
FIG. 4 is a side elevation view of the safety interlock handle of FIG. 3.
Figure 5:
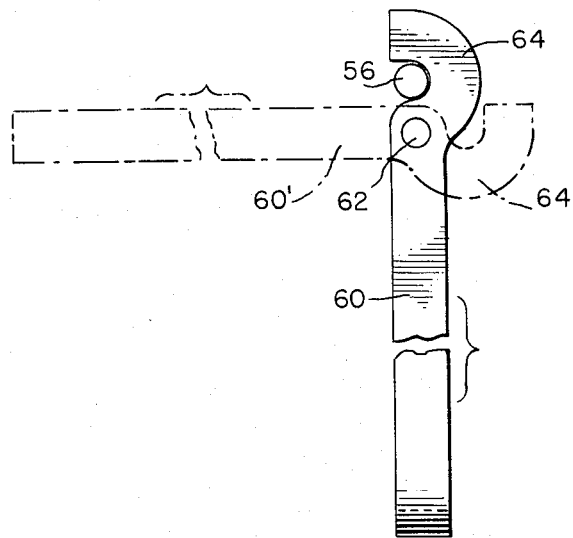
FIG. 5 is a side elevation view of the safety interlock handle disposed alternatively within its locked and released modes.

In accordance then with the present invention, there is provided a safety interlock or latching system which includes a pair of fixed locking pins 56 which extend laterally inwardly from the sidewalls of the housing enclosure 12 which define the fuse assembly chambers. The sidewalls 18 of each fuse panel 14 are provided with rearwardly extending slots 58 within which the locking pins 56 are disposed during a portion of the slideable movement of the fuse assemblies relative to the housing enclosure 12. A U-shaped handle or bail 60 is pivotably mounted upon the sidewalls 18 of the fuse panel 14 by means of pivot pins or trunnions 62. In addition to the disclosure of the handle or bail 60 within FIGS. 1 and 2, this component of the interlocking system of the present invention is also clearly disclosed within FIGS. 3–5, and it is seen that the upper free ends of the handle or bail 60 are provided with C-shaped hooked portions 64 which are adapted to operatively cooperate with the fixed locking pins 56 of the housing enclosure 12. As can best be appreciated from FIG. 5, when the handle 60 is disposed within its normal vertical plane, the hook portions 64 thereof are disposed behind the locking pins 56 thereby preventing withdrawal or removal of the fuse assemblies from the housing enclosre chambers. When the handle 60, however, is rotated forwardly and upwardly through an angle of approximately 90° so as to be disposed within a horizontal plane as denoted at 60' within FIG. 5, it is apparent that the C-shaped hook portions 64 of the handle 60 will be disposed beneath the plane with which the locking pins 56 are disposed. Consequently, the fuse assemblies will be permitted to be slidebly withdrawn from the housing enclosure chambers in view of the fact that the handle hook portions 64 can now pass beneath and locking pins 56.

With particular reference being made to FIG. 2, it will be further appreciated that in order to provide the fuse mounting system of the present invention with the safety characteristics desired in conjunction with such a system, that is, provide the mounting system with a safety interlock means, the safety interlock handle 60 has been disposed immediately behind the elbow connector 44 and its associated insulated line conductor (not shown). In this manner, the handle 60 cannot be pivoted forwardly and upwardly through the requisite 90° in order to release hook portions 64 from the housing enclosure fixed locking pins 56 unless the elbow connector 44 and its line conductor (not shown) have been previously disconnected from the upper fuse loadbreak bushing insert 42. If the elbow connector 44 and its associated line conductor (not shown) have been previously removed or disconnected from the loadbreak bushing insert 42, then the handle 60 can be pivoted forwardly and upwardly so as to release the hook portions 64 from the locking pins 56 and thereby permit subsequent withdrawal of the fuse assembly from the housing enclosure. As best seen in FIG. 1, in order to facilitate the removal of the elbow connector 44 and its associated line conductor (not shown) from loadbreak bushing insert 42 and for storage of such components during the servicing operation, the front face of the housing enclosure panel 12 is provided with a plurality of parking stands 66 which are effectively U-shaped brackets for mounting dummy, "dead", or simulated loadbreak bushing inserts (not shown) upon which the removal elbow connector 44 and its associated line conductor may be mounted. It is lastly noted that in performance of the requisite service upon a particular fuse assembly once the fuse assembly has been slideably withdrawn from the housing enclosure chamber, either the power fuse 28 may be replaced as required, or the entire fuse panel 14 may be replaced with a new power fuse mounted thereon. The fuse panel 14 may be simply removed from the entire fuse assembly or mounting system by simply disengaging the C-shaped loops 54 and panel 14 from the L-shaped tabs or projections 50 of the mounting channel 46. A new panel 14 may then be installed upon mounting channel 46 in a similar manner.

Obviously, many modifications and variations of the present invention are possible in light of the above teachings. It is therefore to be understood that within the scope of the appended claims, the present invention may be practiced otherwise than as specifically described within this patent specification.

We claim:

1. A fuse and fuse mounting arrangement for power distribution systems, comprising:
   a housing enclosure;
   at least one fuse panel capable of having a power fuse mounted thereon, said fuse panel being mounted on the end of a slidable track to thereby allow said fuse panel to slide into and away from said housing enclosure;
   first means operatively defined between said fuse panel and said housing enclosure for releasably locking said fuse panel within said housing enclosure; and
   second means connected to said fuse panel for preventing the releasable unlocking of said first means and said fuse panel from said housing enclosure until said second means has been disconnected from said fuse panel.

2. A fuse and base fuse mounting arrangement as set forth in claim 1, wherein said first means comprises:
   locking pins fixedly secured within said housing enclosure; and
   handle means mounted upon said fuse panel and having hooked portions engageable with said housing enclosure locking pins.

3. A fuse and fuse mounting arrangement as set forth in claim 2, wherein:
   said handle means has a substantially-shaped configuration with upstanding legs; and
   said hooked portions are defined within the uppermost portions of said legs of said U-shaped handle.

4. A fuse and fuse mounting arrangement as set forth in claim 2, wherein:
   said handle means is pivotably mounted upon said fuse panel between a first vertically oriented locking position and a second horizontally disposed unlocking position.

5. A fuse and fuse mounting arrangement as set forth in claim 4, wherein:
   said hooked portions of said handle means are disposed behind said housing enclosure locking pins when said handle means is disposed within said first locking position, and are disposed beneath said housing enclosure locking pins when said handle means is disposed within said second unlocking position.

6. A fuse and fuse mounting arrangement as set forth in claim 1, wherein said second means comprises:
   an electrical connector capable of connection to a power fuse mounted on said fuse panel.

7. A fuse and fuse mounting arrangement as set forth in claim 6, wherein:
   said electrical connector is disposed in front of said first means.

8. A fuse and fuse mounting arrangement as set forth in claim 4, wherein said second means comprises:
   an electrical connector capable of connection to a power fuse mounted on said fuse panel, said electrical connector being disposed in front of said handle means for preventing said handle means from being pivoted to said second horizontal unlocking position until said electrical connector has been disconnected from said power fuse.

9. A fuse and fuse mounting arrangement as set forth in claim 1, further comprising:
   means for storing said second means upon said housing enclosure when said second means has been disconnected from said fuse panel.

10. A fuse and fuse mounting arrangement as set forth in claim 9, wherein:
    said second means comprises an elbow-type electrical connector; and
    said storing means comprises a parking stand type bracket for housing said elbow connector.

11. A fuse and fuse mounting arrangement as set forth in claim 1, wherein:
    said slideable track includes slide bearing means defined between said fuse panel and said housing enclosure.

12. A fuse and fuse mounting arrangement as set forth in claim 11, wherein:
    said fuse panel is removably mounted upon said slide bearing means.

13. A fuse and fuse mounting arrangement as set forth in claim 12, wherein:
    said slide bearing means has attached to one end thereof a mounting channel having upstanding tabs defined thereon; and
    said fuse panel has slot means defined therein for cooperative engagement with said mounting channel tabs.

14. A fuse and fuse mounting arrangement for providing a power distribution system with a safe environment during service operations, comprising:
    a housing enclosure;
    at least one fuse panel capable of having a fuse mounted thereon, said fuse panel being mounted on the end of a slideable track to thereby allow said fuse panel to slide into and away from said housing enclosure;
    a power fuse mounted upon said fuse panel;
    first means operatively defined between said fuse panel and said housing enclosure for releasably locking said fuse panel within said housing enclosure; and
    second means operatively associated with said first means for necessarily electrically isolating said fuse panel prior to operation of said first means for unlocking said first means and said fuse panel from said housing enclosure by preventing unlocking of said first means prior to electrical isolation of said fuse panel.

15. A fuse and fuse mounting arrangement as set forth in claim 14, wherein:
    said first means comprises locking pins fixedly secured within said housing enclosure, and handle means pivotably mounted upon said fuse panel between a first position at which said handle means lockingly engages said locking pins, and a second position at which said handle means releasably bypasses said locking pins; and
    said second means comprises an electrical connector disconnectable from said power fuse, said electrical connector being disposed in front of said handle means for preventing pivotable movement of said handle means to said second position prior to disconnection of said electrical connector from said power fuse.

* * * * *

UNITED STATES PATENT AND TRADEMARK OFFICE
CERTIFICATE OF CORRECTION

PATENT NO. : 4,491,898
DATED : January 1, 1985
INVENTOR(S) : Carl M. Hillman and James W. Dragon It is certified that error appears in the above-identified patent and that said Letters Patent is hereby corrected as shown below:

In Claim 3, Line 3, change the phrase "substantially-shaped" to read "substantially U-shaped"

Signed and Sealed this

Seventh Day of May 1985

[SEAL]

Attest:

DONALD J. QUIGG

Attesting Officer     Acting Commissioner of Patents and Trademarks